United States Patent
Schwaegerl et al.

(10) Patent No.: US 9,481,040 B2
(45) Date of Patent: Nov. 1, 2016

(54) COUPLING PART FOR ROTARY TOOL AND ROTARY TOOL INCLUDING SAME

(71) Applicant: Kennametal Inc., Latrobe, PA (US)

(72) Inventors: Juergen Schwaegerl, Vohenstrauss (DE); Berthold Heinrich Zeug, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 75 days.

(21) Appl. No.: 14/282,426

(22) Filed: May 20, 2014

(65) Prior Publication Data

US 2014/0348602 A1    Nov. 27, 2014

(30) Foreign Application Priority Data

May 21, 2013  (DE) .......................... 10 2013 209 371

(51) Int. Cl.
*B23B 51/02*    (2006.01)
*B23B 51/06*    (2006.01)

(52) U.S. Cl.
CPC ............. *B23B 51/02* (2013.01); *B23B 51/06* (2013.01); *B23B 2250/12* (2013.01); *B23B 2251/02* (2013.01); *Y10T 408/455* (2015.01); *Y10T 408/9098* (2015.01); *Y10T 408/95* (2015.01)

(58) Field of Classification Search
CPC ........... Y10T 408/9098; Y10T 408/95; Y10T 408/455; B23B 51/02; B23B 51/06; B23B 2251/02
See application file for complete search history.

(56) References Cited

U.S. PATENT DOCUMENTS

| 329,660 | A | * | 11/1885 | Lord | ................. B27G 15/00 408/213 |
| 6,012,881 | A | | 1/2000 | Scheer | |
| 6,059,492 | A | * | 5/2000 | Hecht | ................. B23B 51/00 408/144 |
| 7,407,350 | B2 | | 8/2008 | Hecht | |
| 7,559,382 | B2 | * | 7/2009 | Koch | ................. B23B 51/02 175/415 |

(Continued)

FOREIGN PATENT DOCUMENTS

| DE | 94340 | * | 10/1897 | ............ B23B 51/02 |
| DE | 384720 C | * | 11/1923 | ............ B23B 51/02 |

(Continued)

OTHER PUBLICATIONS

May 13, 2014—office_action.

*Primary Examiner* — Sunil K Singh
*Assistant Examiner* — Ryan Rufo
(74) *Attorney, Agent, or Firm* — Matthew S. Bedsole

(57) ABSTRACT

A coupling part structured to engage with a complementary coupling part for interchangeably fastening a cutting head to a carrier of a rotary cutting tool. The coupling part includes a pair of coupling pins arranged opposite each other with respect to a central longitudinal axis and spaced apart from each other so as to form a receiving space structured to receive a central pin of the complementary coupling part. Each coupling pin includes a stop surface for transmitting a torque, a radially external outer surface, and a radially internal inner surface. At least one of the outer surface or inner surface is a clamping surface oriented in an obliquely inclined manner with respect to the central longitudinal axis for centering and clamping the coupling part.

19 Claims, 4 Drawing Sheets

(56) References Cited

U.S. PATENT DOCUMENTS

| | | | |
|---|---|---|---|
| 8,142,116 B2 | 3/2012 | Frejd | |
| 8,376,669 B2 | 2/2013 | Jaeger et al. | |
| 2003/0039523 A1* | 2/2003 | Kemmer | B23B 51/02 408/231 |
| 2003/0091402 A1* | 5/2003 | Lindblom | B23B 51/02 408/231 |
| 2008/0193237 A1* | 8/2008 | Men | B23B 51/02 408/226 |
| 2010/0021253 A1 | 1/2010 | Frejd | |
| 2010/0143059 A1 | 6/2010 | Hecht | |
| 2011/0097168 A1* | 4/2011 | Jager | B23B 51/02 408/200 |
| 2011/0318128 A1 | 12/2011 | Schwaegerl et al. | |

FOREIGN PATENT DOCUMENTS

| | | | | |
|---|---|---|---|---|
| DE | 102004022747 A1 | * | 11/2005 | ......... B23B 51/0027 |
| DE | 10 2012 200 690.7 A1 | | 7/2013 | |
| DE | 10 2013 205 889.6 | | 5/2014 | |
| EP | 0 813 459 B1 | | 12/1997 | |
| EP | 1 996 358 B1 | | 12/2008 | |
| JP | 2002-113606 A | * | 4/2002 | ............ B23B 51/00 |
| JP | 2004-255533 A | * | 9/2004 | ............ B23B 51/00 |
| JP | 2005169542 A | | 6/2005 | |
| JP | 2011-036977 A | * | 2/2011 | ............ B23B 51/00 |
| WO | WO 03/031104 | * | 4/2003 | ............ B23B 51/02 |

* cited by examiner

COUPLING PART FOR ROTARY TOOL AND ROTARY TOOL INCLUDING SAME

BACKGROUND

1. Field of the Invention

Embodiments of the present invention relate to coupling parts, in particular to cutting heads for rotary tools, such as drilling tools. Embodiments of the present invention further relates to coupling parts which are complementary with respect thereto, in particular to a carrier, and also to a rotary tool.

2. Background Information

An example rotary tool which embodiments of the present invention improves can be gathered, for example, from EP 0 813 459 B1. Rotary tools of this type are modular tools, in which the cutting head is insertable in a reversibly interchangeable manner into a carrier. For this purpose, a coupling is required between cutting head and carrier. A coupling generally has stop surfaces which serve to transmit a torque between the cutting head and the carrier. Furthermore, clamping or centering surfaces are provided as further functional surfaces, via which the cutting head is oriented in an axially parallel manner relative to the carrier.

In the case of the coupling which can be gathered from EP 0 813 459 B1, the cutting head has, at the rear end thereof oriented toward the carrier, a coupling pin which is received in a coupling receptacle of the carrier. The coupling pin merges here via a flat head support surface, with which the cutting head comes to rest on a flat end support surface of the carrier. The coupling pin here has the stop surfaces and the clamping or centering surfaces. The coupling pin is therefore wound around by flutes from the webs as far as possible recesses, and both functional surfaces, i.e., the stop surfaces and the clamping surfaces, are arranged in the interior and do not extend as far as an outer circumferential surface.

EP 1 996 358 B1 discloses a further coupling point with a wound-around coupling pin, but in which flutes do not interrupt the winding therearound.

In addition to this wound-around type, couplings are also known, in which the wound-around coupling pin merely bears the clamping surfaces, but, by contrast, the stop surfaces protrude in the radial direction, with a step being formed, and reach as far as the outer circumferential surface. A non-wound-around coupling of this type can be gathered, for example, from US 2011/0318128 A1 and from U.S. Pat. No. 6,059,492. Said documents also disclose a dovetail-shaped configuration of the clamping surfaces, and therefore said clamping surfaces form an engagement from behind in order to ensure axial pull-out protection.

The applicant's DE 10 2012 200 690.7, which has not yet been published at the filing date, describes a coupling of the wound-around type, in which the coupling pin, as viewed in cross section, has an approximately rectangular basic shape and is cut by flutes. The transverse sections of the coupling pin here form the clamping sections, whereas the longitudinal sections of the coupling pin form the stop surfaces. The coupling pin is at the same time of overall approximately dovetail-shaped design. The coupling point is in the form of a self-centering and self-clamping, reversibly interchangeable coupling. No additional fastening elements, such as screws or the like, are provided for securing the cutting head in the carrier.

A further example of a coupling of the wound-around type can be gathered from the applicant's DE 10 2013 205 889.6, which likewise has not yet been published at the filing date. Proceeding from the configuration according to DE 10 2012 206 690.7, the coupling pin here has an axially front pin region and an axially adjoining rear pin region, wherein the clamping surfaces and the stop surfaces are designed for transmitting torque to different pin regions.

In the case of couplings of this type, because of the comparatively large, centrally arranged coupling pin, comparatively thin edge webs remain on the carrier, which edge webs are also still interrupted by flutes.

SUMMARY OF THE INVENTION

Starting therefrom, embodiments of the invention generally provide a self-clamping, reversibly releasable coupling between two coupling parts, in particular between a cutting head of a drilling tool and a carrier corresponding thereto, which coupling is suitable for absorbing high forces.

As one aspect of the invention, a coupling part for a cutting head is provided. The coupling part is designed for the reversible, interchangeable fastening to a further complementary coupling part in the manner of the wound-around type. The lower side of said coupling part, which side is oriented toward the complementary coupling part, has two coupling pins which are arranged opposite each other with respect to a center longitudinal axis and are spaced apart from each other so as to form a receiving space for a central pin of the further coupling part. Each of the two coupling pins has in each case a radially external outer surface and a radially internal inner surface. The inner surfaces therefore bound the central receiving space. Furthermore, stop surfaces are formed for transmitting torque and clamping surfaces are formed for clamping and centering. The clamping surfaces here are formed in an obliquely inclined manner with respect to the center longitudinal axis in order to form a form-fitting engagement from behind for axial pull-out protection.

The coupling point here is generally designed in the manner of the wound-around type. The two coupling pins are therefore enclosed by an in particular flat head support surface. The coupling part is preferably a cutting head of a modular rotary tool, in particular a drilling tool. In the fitted state, the coupling pins engage in coupling receptacles of the complementary coupling part, in particular in a carrier of the modular rotary tool. The first coupling part is generally referred to below as cutting head and the further, complementary coupling part as carrier. In principle, the reverse configuration is also possible. The configuration of the coupling is not restricted here to the use for the connection between a cutting head and a carrier of a rotary tool.

The central receiving space, in which a central pin of the complementary coupling part engages, is formed by the arrangement of two separate coupling pins which are spaced apart from each other. Overall, as a result, the complementary coupling part has a high degree of rigidity in the region of the coupling point.

In general, said coupling is a self-centering coupling which is self-clamping in the axial direction and can be connected and/or released again preferably without a tool. For this purpose, the cutting head is typically inserted in the axial direction into the coupling receptacle and subsequently brought by rotation into the end position. The bracing and clamping take place here by means of a certain elasticity of the coupling pins and/or by corresponding webs on the carrier.

The coupling pins expediently form an annular segment surface, as viewed in a top view. Both the internal inner surface and the external outer surface are therefore generally of curved design. An annular segment surface is understood in general as meaning that the two surfaces are curved concavely, but not absolutely concentrically with respect to each other. However, the two surfaces are preferably oriented concentrically with respect to each other—at least as viewed in a cross section transversely with respect to the center longitudinal axis.

The stop surface which is effective for transmitting torque is designed as a connecting surface between the inner surface and the outer surface. The stop surface here is expediently likewise curved, in particular is designed to be curved convexly outward such that edges which could result in stress concentrations are preferably not formed in the transition region to the inner surface or outer surface. As a result, the loading is kept low overall.

The coupling pins here are preferably spaced apart at least by a core diameter. They are therefore arranged to a comparatively far extent radially on the outside, which has a favorable effect on the transmission of torque. At the same time, a sufficiently large remaining central receiving space which is suitable for receiving functional elements, for example a coolant channel, is formed. Core diameter here is generally understood as meaning the smallest distance between opposite flutes.

A central coolant connection is preferably formed on the base of the receiving space between the coupling pins. Therefore, during operation, coolant is fed via said central coolant connection into the coupling part, i.e., into the cutting part, the coolant being guided in a suitable manner to cutting edges or onto an end side of the cutting head. For this purpose, corresponding distributing bores can be provided.

At least one of the two surfaces, i.e., either the inner surface or the outer surface, expediently forms the clamping surface. That is to say, in the coupled state, at least one of the pairs of surfaces, i.e., either the pair of inner surfaces or the pair of outer surfaces, therefore bears in a clamping manner against corresponding external clamping surfaces of the central pin of the other coupling part or against internal clamping surfaces of the edge webs of the other coupling part. In the coupled state, the surfaces not acting as clamping surfaces have play with respect to the corresponding surfaces of the other coupling part. In principle, the inner surfaces and the outer surfaces can also be designed as clamping surfaces without play in the coupled state. In addition, the clamping surfaces are inclined obliquely with respect to the center longitudinal axis in order to form an undercut with the complementary coupling part in the manner of a dovetail connection. In this connection, the outer surface is preferably formed in an obliquely inclined manner.

According to a first variant embodiment, both the inner surface and the outer surface are arranged in an inclined manner here, specifically preferably at an identical angle. The two surfaces therefore preferably both run outward in an obliquely inclined manner, and therefore, overall, each coupling pin is designed as a curved part which is inclined obliquely outward and is in the manner of a segment of a circle. This in particular achieves comparatively high stability for the cutting head.

Alternatively, the two surfaces are oriented obliquely in an opposed manner, and therefore both the inner surface and the outer surface are designed for forming an undercut in the manner of a dovetail connection. The coupling pin therefore widens continuously with the two surfaces in the direction of the complementary coupling part.

According to a third variant embodiment, only one of the surfaces, in particular the outer surface, is inclined and the other surface forms a cylindrical circumferential surface. By this means, the advantage of good centering of the cutting head with respect to the complementary coupling part is achieved.

In an expedient development, the respective coupling pin has two sections connected to each other in the direction of the center longitudinal axis, namely a clamping section with the clamping surface and a stop section with the stop surface. The two functional regions, namely clamping and centering, on the one hand, and entraining of torque, on the other hand, are therefore decoupled with respect to each other in the longitudinal direction. By this means, the different section regions of the coupling pin can be designed in an optimized manner for the respective function.

The two sections here are expediently oriented at an angle to each other. The clamping section with the clamping surface is designed in this connection in an inclined manner in order to form an engagement from behind at least with its inner surface and/or its outer surface. At the same time, the stop section is preferably designed with surfaces oriented parallel to the center longitudinal axis.

Owing to the functional separation into different sections, a different configuration is made possible. This is expediently used to the effect that the two sections extend over different angular ranges. Provision is made here in particular for the clamping section to extend over a relatively large angular range. This achieves reliable clamping, since as large a clamping surface as possible is provided. At the same time, the stop section can be designed to be comparatively short, since, in order to entrain torque, only the stop surface oriented in the circumferential direction is crucial, and therefore the length of the respective coupling pin merely has to be sufficiently dimensioned in the circumferential direction in order to be able to absorb the torque forces required.

In an expedient development, the receiving space here is formed merely between the two sections which are oriented in the direction of the complementary coupling part. A solid, central section, in particular the clamping section without a recess, is therefore formed in the front region oriented toward the cutting head tip. In the front section region, the coupling part therefore corresponds to a conventional coupling part having merely one central pin.

As another aspect of the present invention, a coupling part, which is complementary to the aforementioned coupling part, is provided. Said complementary coupling part is designed in a complementary manner to the coupling part in so far as, in order to receive the coupling pins, said complementary coupling part is designed with coupling receptacles corresponding to said coupling pins. The coupling receptacles here are formed separately and are spaced apart from each other, wherein a central pin which extends into the receiving space is arranged between the coupling receptacles. The diameter of the central pin is matched here to the distance between the two coupling pins. When the coupling part is inserted, the outer surfaces and the inner surfaces of the coupling pins therefore preferably bear in each case against corresponding surfaces of the coupling receptacles.

As yet another aspect of the present invention, a rotary tool, in particular a drilling tool, is provided. The rotary tool having the coupling part as cutting head and the complementary coupling part as carrier. The cutting head here is fastened interchangeably on the end side of the carrier.

BRIEF DESCRIPTION OF THE
ACCOMPANYING FIGURES

Novel features and characteristics of the disclosure are set forth in the appended claims. The disclosure itself, however, as well as a preferred mode of use, further objectives and advantages thereof, will best be understood by reference to the following description of an illustrative embodiment when read in conjunction with the accompanying figures. One or more embodiments are now described, by way of example only, with reference to the accompanying figures, in which, partially in simplified representations:

Figure 5A:
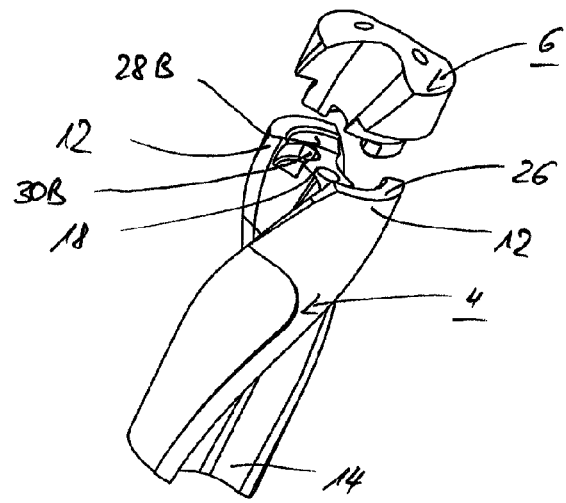
Figure 5B:
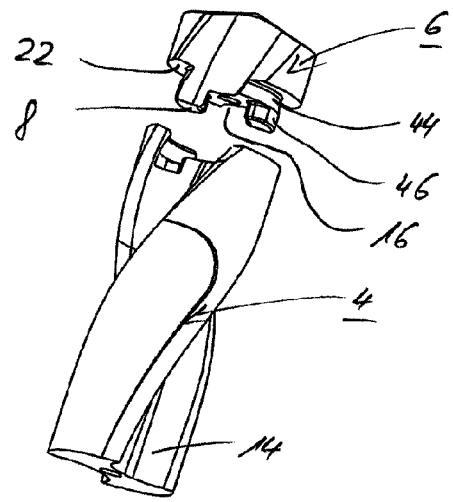
Figure 6A:
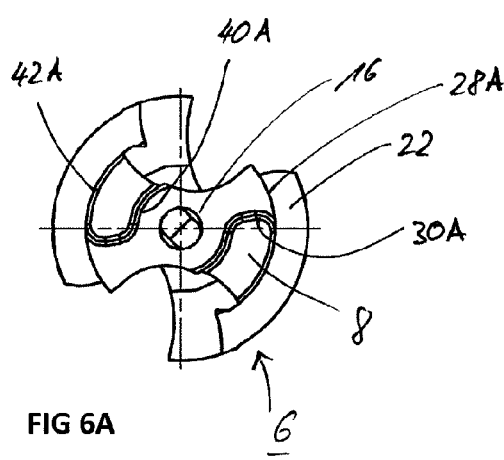
Figure 6B:
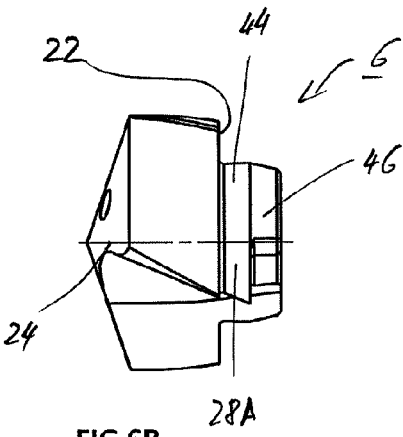
Figure 6C:
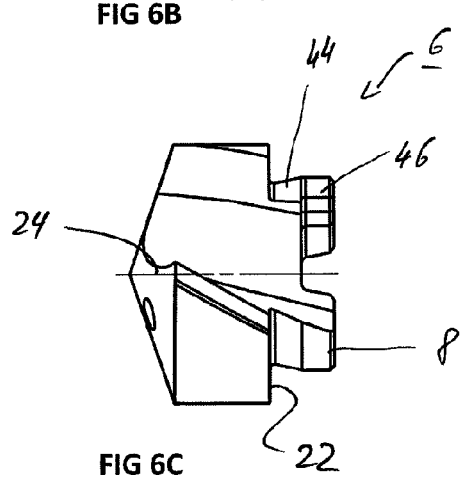
Figure 7:
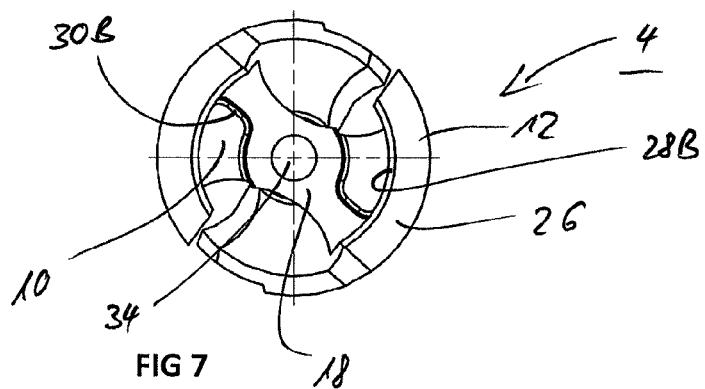
Figure 8A:
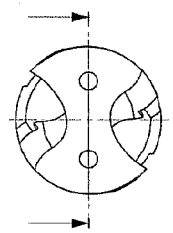
Figure 8B:
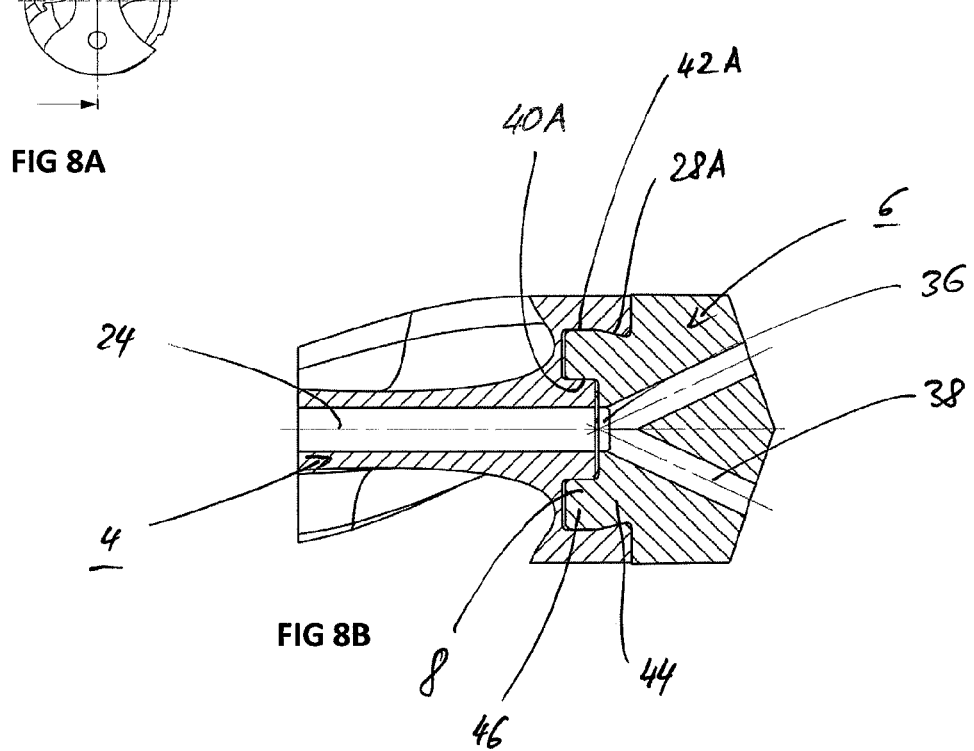

FIGS. 5A and B show partial perspective exploded illustrations of a drilling tool according to a second variant embodiment;

FIGS. 6A-6C show a horizontal projection from below of the cutting head and also two side views, rotated by 90°, according to a second variant embodiment;

FIG. 7 shows a horizontal projection of the carrier and of the coupling receptacle according to the second variant embodiment, FIG. 8A shows an end view of the second variant embodiment; and FIG. 8B shows a sectional view according to the section line in FIG. 8A.

DETAILED DESCRIPTION

In the figures, parts acting in an identical manner are in each case depicted by the same reference numbers. The drilling tool in the two variant embodiments is designed as a modular drilling tool with a carrier and with a cutting head 6 which is fastenable in a reversible manner in said carrier. The coupling between carrier 4 and cutting head 6 takes place here with the aid of what is referred to as the wound-around type. For this purpose, the cutting head 6 has, at the rear end thereof, two coupling pins 8 which extend in the axial or longitudinal direction and are each insertable into a coupling receptacle 10 of the carrier 4. The coupling receptacles 10 are formed circumferentially in each case by two edge webs 12, which extend in the axial direction, as a continuation of a respective back of the drill. Said edge webs 12 are interrupted by flutes 14. The edge webs 12 completely enclose the two coupling pins 8 apart from the interruption by the flutes 14.

A central receiving space 16 is formed centrally between the two coupling pins 8. A central pin 18 is formed on the carrier 4 as a counterpart complementary to said receiving space. The central pin 18 is connected here via radial webs 20 to the edge webs 12 running in the circumferential direction. Overall, the end side of the carrier 4 is therefore formed by an approximately S-shaped contour of the webs 12, 20, with the central pin 18 being incorporated, thus resulting by this means in a high level of rigidity overall.

The two coupling pins 8 protrude here from an in particular flat head support surface 22 and extend in the direction of a center longitudinal axis 24. The latter at the same time also forms an axis of rotation about which the drilling tool rotates during operation.

In a manner corresponding to the flat head support surface 22, a flat end support surface 26 is formed on the carrier 4 by the respective end sides of the webs 12. In the first variant embodiment, the radial webs 20 and the central pin 18 also form part of the end support surface 26. In the fitted state, the cutting head 6 rests with the head support surface 22 thereof flat on the end support surface 26.

Each of the coupling pins 8 has a centering and clamping surface 28A and a stop surface 30A. The clamping surface 28A serves for centering and clamping the respective coupling pin 8 and therefore the entire cutting head 6 in the coupling receptacles 10 of the carrier 4. The stop surfaces 30A serve for transmitting a torque from the carrier 4 to the cutting head 6. Accordingly, corresponding clamping surfaces 28B and stop surfaces 30B are therefore also formed on the coupling receptacles 10.

In general, surfaces on the cutting head are referred to below by the letter A and surfaces which are complementary with respect thereto on the carrier by the letter B.

A core 32 with a core diameter d is formed in the carrier 4 between the two flutes 14. A central coolant channel 34 is formed in said core, the coolant channel being continued in the cutting head 6 by a central coolant connection 36. In the exemplary embodiment, coolant bores 38 emerge from said coolant connection (cf. in particular FIGS. 4B, 4C, 4D), said coolant bores opening out at end-side outlet points on the cutting head 6. As an alternative thereto, the opening points can also be arranged in the flutes 14.

The cutting head 6 is mounted on the carrier 4 in particular without a tool by the cutting head 6 first of all being placed in the axial direction onto the carrier 4, with the coupling pins 8 engaging in the clearances of the flutes 14. The cutting head 6 is subsequently rotated in relation to the carrier 4 such that the coupling pins 8 are inserted into the coupling receptacles 10, which are in each case open toward the flutes 14. During this insertion operation, the clamping surfaces 28A, 28B come into contact with each other and clamp and center the cutting head 6. In the end position, the stop surface 30A, 30B comes to a stop, and therefore the cutting head 6 is held in the carrier 4 in an overall self-clamping and play-free manner. For reliable pull-out protection in the axial direction, the coupling pins 8 and the coupling receptacles 10 are connected to one another here in the manner of a dovetail. As is explained in particular with reference to FIGS. 4B to 4D, different configurations in this respect are possible.

Figure 1A:
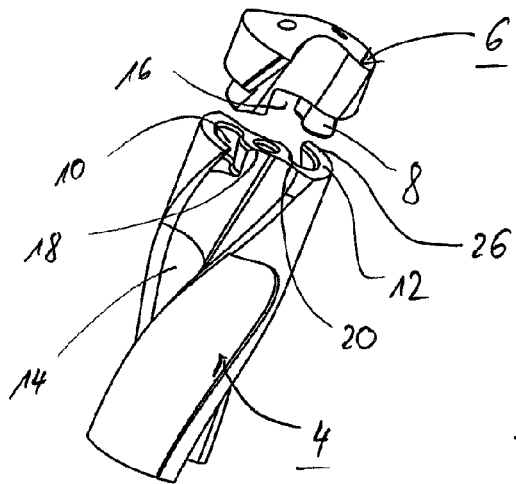
FIGS. 1A and 1B show partial perspective exploded illustrations of a drilling tool with a cutting head and a carrier of a first variant embodiment.
Figure 1B:
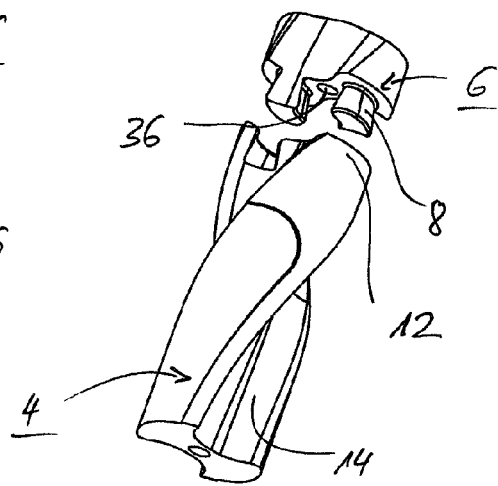
Figure 2A:
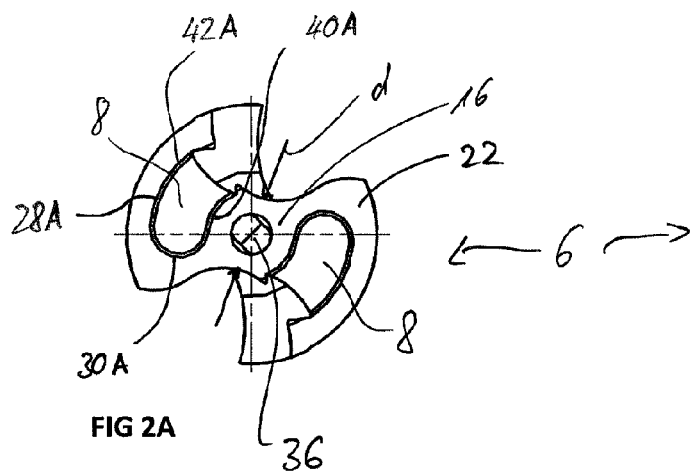
FIGS. 2A-2C show a horizontal projection from below of the cutting head and also two side views, which are rotated by 90°, of the first variant embodiment.
Figure 2B:
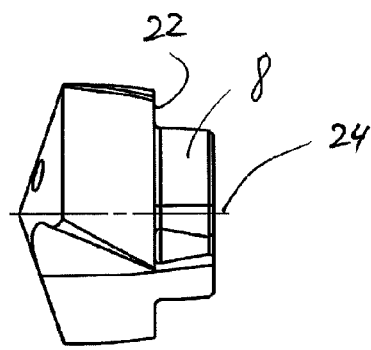
Figure 2C:
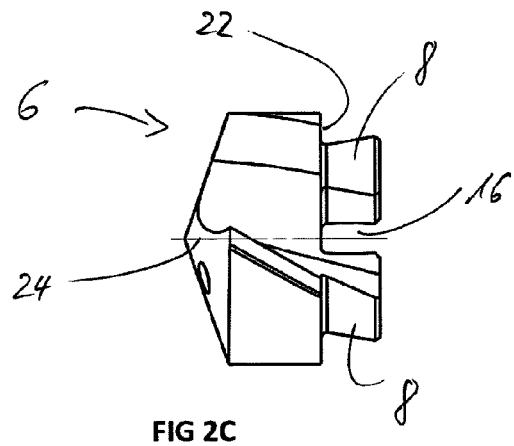
Figure 3:
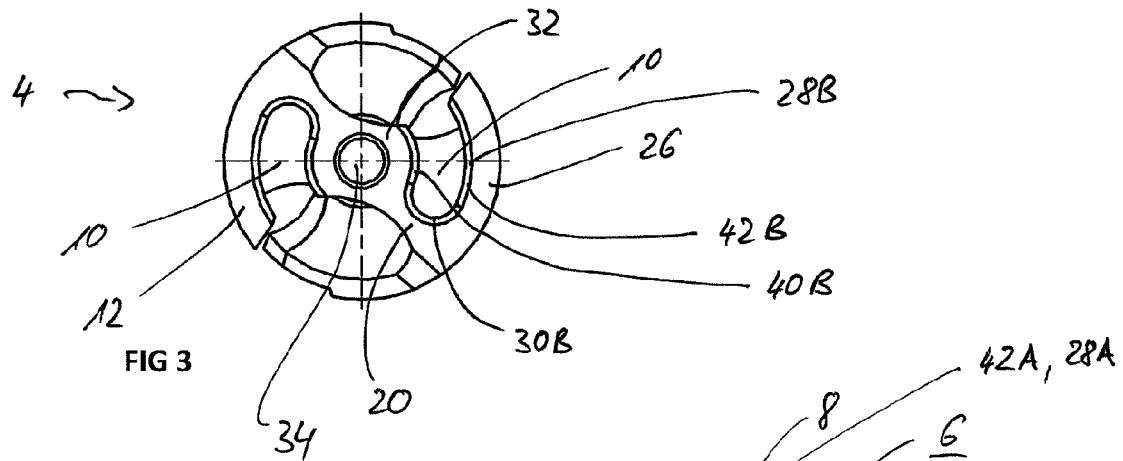
FIG. 3 shows a horizontal projection of the carrier and of the coupling receptacle according to the carrier in FIGS. 1A and 1B.

In general, the coupling pins 8 each have a radially internal inner surface 40A and a radially external outer surface 42A. As can be gathered in particular from FIG. 2A, said surfaces—as viewed in horizontal projection—are arranged concentrically with respect to each other and are connected to each other via the stop surface 30A. The stop surface 30A here is of curved design and merges in an edge-free manner into the inner surface 40A and the outer surface 42A.

Inner surfaces 40B and outer surfaces 42B are formed on the carrier 4 in a complementary manner to the inner surfaces 40A and outer surfaces 42A on the cutting head 6.

The clamping surfaces 28A, B are preferably primarily formed by the outer surfaces 42A, B. In principle, the inner surfaces 40A, B can also form the clamping surfaces and centering surfaces.

Figure 4A:
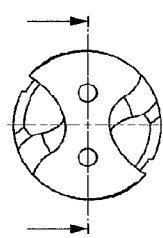
FIG. 4A shows an end view of the drilling tool according to FIGS. 1A and 1B.
Figure 4B:
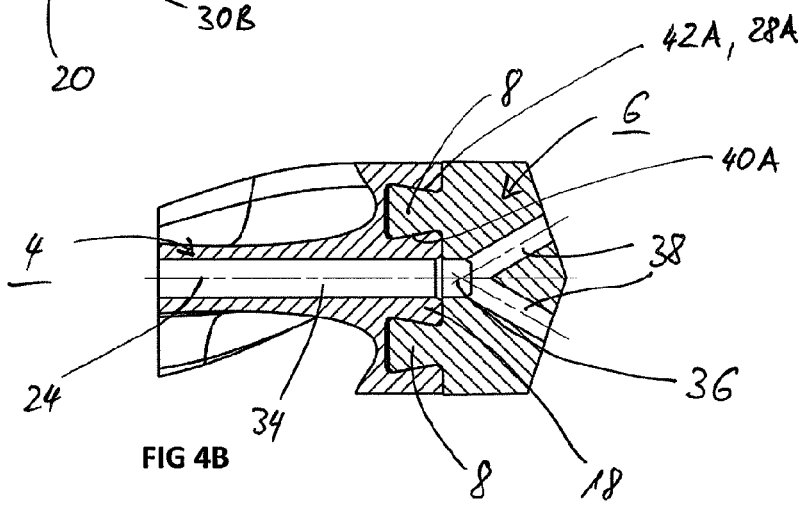
FIGS. 4B-4D show a sectional view according to the section line in FIG. 4A of various variants.
Figure 4C:
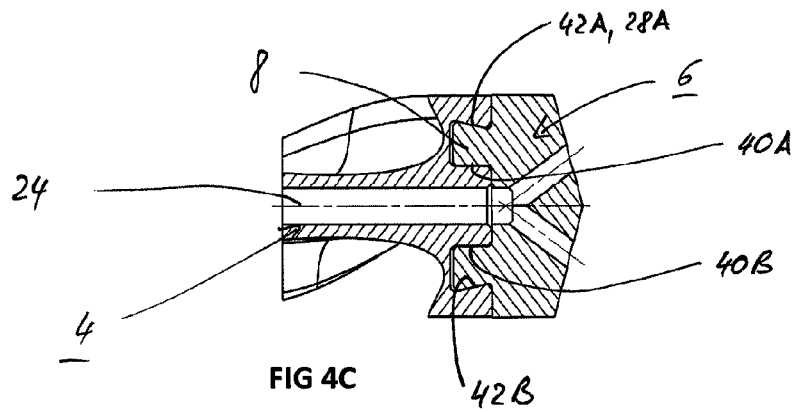
Figure 4D:
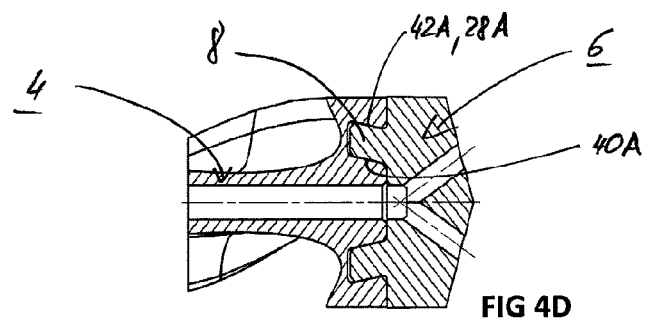

In the variant embodiments according to FIGS. 4B and 4D, the two surfaces 40A, 42A are arranged in an obliquely inclined manner in relation to the head support surface 22, which is oriented perpendicularly to the center longitudinal axis 24. In the variant embodiment of FIG. 4B, the two surfaces 40A, 42A are arranged in an opposed manner inclined outward or inward such that there is in each case a double undercut with the corresponding complementary surfaces 40B, 42B of the coupling receptacle 10 in order to form a dovetail toothing.

By contrast, in the variant embodiment of FIG. 4D, the surfaces 40A, B and 42A, B are arranged in the same direction, in particular inclined outward at the same angle, and therefore only the outer surfaces 42A, B form an undercut for pull-up protection in the axial direction. In this variant embodiment, the central pin 18 is therefore formed in a manner tapering conically toward the end side. In contrast thereto, in the variant embodiment of FIG. 4B, said central pin, toward the carrier 4, has a tapered portion from which said central pin widens conically toward the end side. The configuration according to FIG. 4B permits high pull-out security on account of the undercuts on both sides. The configuration according to FIG. 4D results in a comparatively high level of stability for the cutting head 6, in particular since only a small stress loading occurs at the inner surfaces 40A, 40B because of the obtuse angle.

Finally, there is also the possibility of designing at least one of the pairs of surfaces 40A, B or 42A, B as cylindrical circumferential surfaces, as is illustrated with reference to FIG. 4C using the example of the inner surfaces 40A, B. In this exemplary embodiment, the central pin 18 is therefore of cylindrical design.

In the second variant embodiment which is illustrated in FIGS. 5-8, the coupling pins 8 and also, in a manner corresponding thereto, the coupling receptacles 10 are divided in the direction of the center longitudinal axis 24 into two separate functional sections, namely into a clamping section 44 and into a stop section 46. The two sections 44, 46 directly adjoin each other.

In the exemplary embodiment, the clamping section 44 adjoins the head support surface 22. The corresponding clamping surfaces 28A are in turn oriented in a manner inclined obliquely outward in order to form an undercut. As can be gathered in particular from FIG. 5A or else from the cross-sectional illustration according to FIG. 8B, the cutting head 6 is also of solid design in the central region in the region of the clamping section 44. The receiving space 16 therefore only extends partially only over the axial length of the stop section 46.

In the region of the clamping section 44, the edge webs 12 on the carrier therefore run circumferentially between the two flutes 14 without being connected to each other via the central pin 18, since the latter, recessed in the axial direction, begins only level with the stop section 46. Owing to this measure, the clamping surfaces 48A, B therefore extend over the entire angular range of the edge webs 12. By contrast, the stop section 46 is formed only over a limited angular range, as can be gathered in particular from FIG. 5A. In the region of the stop section 46, the central pin 18 is connected in turn to the outer edge webs 12. Conversely, this means that, on the cutting head 6, the clamping section 44 forms a central, solid pin section without an interruption (except for the central coolant connection 36) and having a flat, horizontally running surface, from which the stop sections 46 protrude in the axial direction.

We claim:

1. A coupling part structured to engage with a complementary coupling part for interchangeably fastening a cutting head to a carrier of a rotary cutting tool, the coupling part comprising a pair of coupling pins arranged opposite each other with respect to a central longitudinal axis and being spaced apart from each other so as to form a receiving space structured to receive a central pin of the complementary coupling part, wherein each coupling pin comprises:
   a curved stop surface for transmitting a torque;
   a radially external outer surface; and
   a radially internal inner surface,
      wherein at least one of the outer surface or inner surface is a clamping surface oriented in an obliquely inclined manner with respect to the central longitudinal axis for centering and clamping the coupling part; and
      wherein the stop surface connects the inner surface and the outer surface.

2. The coupling part as claimed in claim 1, wherein the coupling pins form an annular segment surface, as viewed in a top view.

3. The coupling part as claimed in claim 1, wherein the coupling pins are spaced apart from each other at least by a core diameter.

4. The coupling part as claimed in claim 1, further comprising a coolant connection formed between the coupling pins.

5. The coupling part as claimed in claim 1, wherein both the inner surface and the outer surface of each coupling pin are arranged in an inclined manner with respect to the central longitudinal axis.

6. The coupling part as claimed in claim 1, wherein one of the inner surface and the outer surface is of cylindrical design.

7. The coupling part as claimed in claim 1, wherein each coupling pin has a clamping section connected to a stop section in the direction of the central longitudinal axis, the clamping section including the clamping surface and the stop section including the stop surface.

8. The coupling part as claimed in claim 7, wherein the clamping section and the stop section are oriented at an angle to each other.

9. The coupling part as claimed in claim 8, wherein:
   the clamping section extends circumferentially around the central longitudinal axis;
   the stop section extends circumferentially around the central longitudinal axis; and
   a circumferential length of the clamping section is larger than a circumferential length of the stop section.

10. A complementary coupling part structured to interchangeably receive the coupling part as claimed in claim 1, the complementary coupling part comprising two coupling receptacles, between which a central pin is arranged, each coupling receptacle structured to receive a respective coupling pin of the pair of coupling pins.

11. A coupling part structured to engage with a complementary coupling part for interchangeably fastening a cutting head to a carrier of a rotary cutting tool, the coupling part comprising a pair of coupling pins arranged opposite each other with respect to a central longitudinal axis and being spaced apart from each other so as to form a receiving space structured to receive a central pin of the complementary coupling part, wherein each coupling pin comprises:
   a stop surface for transmitting a torque;
   a radially external outer surface; and
   a radially internal inner surface,
      wherein at least one of the outer surface or inner surface is a clamping surface oriented in an obliquely inclined manner with respect to the central longitudinal axis for centering and clamping the coupling part; and
      wherein both the inner surface and the outer surface of each coupling pin are arranged in an inclined manner with respect to the central longitudinal axis.

12. The coupling part as claimed in claim 11, wherein the coupling pins form an annular segment surface, as viewed in a top view.

13. The coupling part as claimed in claim 11, wherein the coupling pins are spaced apart from each other at least by a core diameter.

14. The coupling part as claimed in claim 11, further comprising a coolant connection formed between the coupling pins.

15. The coupling part as claimed in claim 11, wherein one of the inner surface and the outer surface is of cylindrical design.

16. The coupling part as claimed in claim 1, wherein each coupling pin has a clamping section connected to a stop section in the direction of the central longitudinal axis, the clamping section including the clamping surface and the stop section including the stop surface.

17. The coupling part as claimed in claim 16, wherein the clamping section and the stop section are oriented at an angle to each other.

18. The coupling part as claimed in claim 16, wherein:
the clamping section extends circumferentially around the central longitudinal axis;
the stop section extends circumferentially around the central longitudinal axis; and
a circumferential length of the clamping section is larger than a circumferential length of the stop section.

19. A complementary coupling part structured to interchangeably receive the coupling part as claimed in claim 11, the complementary coupling part comprising two coupling receptacles, between which a central pin is arranged, each coupling receptacle structured to receive a respective coupling pin of the pair of coupling pins.

* * * * *